United States Patent [19]

Hyakutake

[11] Patent Number: 4,933,767
[45] Date of Patent: Jun. 12, 1990

[54] VIDEO INTERMEDIATE FREQUENCY SIGNAL PROCESSING CIRCUIT

[75] Inventor: Junichi Hyakutake, Itami, Japan

[73] Assignee: Mitsubishi Denki Kabushiki Kaisha, Tokyo, Japan

[21] Appl. No.: 296,835

[22] Filed: Jan. 13, 1989

[30] Foreign Application Priority Data

May 30, 1988 [JP] Japan .................. 63-133071

[51] Int. Cl.⁵ .................. H04N 5/52; H04N 5/60
[52] U.S. Cl. .................. 358/195.1; 358/196; 358/198
[58] Field of Search .................. 358/160, 188, 193.1, 358/167, 195.1, 196, 198

[56] References Cited

U.S. PATENT DOCUMENTS 4,811,096  3/1989  Gukamura .................. 358/188

OTHER PUBLICATIONS

P. Fockens, C. G. Eilers; Intercarrier Buzz Phenomena Analysis and Cures, IEEE Transactions on Consumer Electronics, vol. CE-27, No. 3, Aug. 1981, pp. 381-397.
A. Hamada, Phase-Lock Television IF Amplifier-Video Detector, IEEE Transactions on Consumer Electronics, vol. CE<21, No. 4, Nov. 1975, pp. 340-347.
M. Huber, H. Kriedt, R. Stepp, Modular Video IF Concept, IEEE Transactions on Consumer Electronics, vol. CE-29, No. 3, Aug. 1983, pp. 414-419.

*Primary Examiner*—Howard W. Britton
*Assistant Examiner*—Mark R. Powell
*Attorney, Agent, or Firm*—Oblon, Spivak, McClelland, Maier & Neustadt

[57] ABSTRACT

A video intermediate frequency signal processing circuit includes synchronous detection circuit (77) which receives a video intermediate frequency signal through a path including a bandpass filter (51), a phase locked loop circuit (59) and an automatic phase control loop (67), and another path including another bandpass filter (53). Both signals received by the synchronous detection circuit (77) are maintained to be the same in phase by virtue of the operation of the automatic phase control loop (67), so that the synchronous detection circuit (77) generates a video detection output signal including a video signal accurately demodulated and a sound intermediate frequency signal having no phase modulation component causing a sound buzz.

8 Claims, 8 Drawing Sheets

VIDEO INTERMEDIATE FREQUENCY SIGNAL PROCESSING CIRCUIT

BACKGROUND OF THE INVENTION

1. Field of the Invention

The present invention relates to a circuit for processing a video intermediate frequency signal and, more particularly, to a video detection circuit for demodulating the video intermediate frequency signal to generate a video signal.

2. Description of the Background Art

FIG. 1 is a block diagram schematically showing the circuit structure of a conventional television receiver of an intercarrier system. Referring to FIG. 1, a television broadcasting signal received by an antenna 11 is converted to a video intermediate frequency signal having video carrier frequency $f_p$ (45.75 MHz in U.S.A.) by a tuner 13. The video intermediate frequency signal includes a sound intermediate frequency signal component having sound carrier frequency $f_{S1}$ (41.25 MHz in U.S.A.). The video intermediate frequency signal is amplified by an intermediate frequency amplifier 15 and thereafter received by a video detection circuit 17 which in turn detects the video intermediate frequency signal to output a video detection output signal including a demodulated video signal component and a frequency-converted sound intermediate frequency signal component having sound carrier frequency $f_{S2}$ (4.5 MHz in U.S.A.). The sound intermediate frequency signal component is removed through a sound trap circuit 19, and thus only the demodulated video signal component is processed by a video circuit 21 to be provided to a picture tube 23. On the other hand, only the sound intermediate frequency signal component is extracted through a sound filter 25. A sound frequency demodulation circuit 27 demodualtes the extracted sound intermediate frequency signal to generate a sound signal. This sound signal is amplified by a sound amplifier 29 to be outputted to a speaker 31.

FIG. 2 is a block diagram showing the typical circuit structure of the intermediate frequency amplifier 15 and the video detection circuit 17. The video intermediate frequency signal from the tuner 13 is inputted in a bandpass filter 33 which is formed by a surface acoustic wave filter, for example. The bandpass filter 33 has a bandpass characteristic shown in FIG. 3, wherein a passing amount is $-6$ dB at frequency $f_p$ and varies along a liner inclination in a frequency range of $f_p \pm 0.7$ MHz. It is well known that a normal video detection output can be obtained through the bandpass filter 33 having such a bandpass characteristic, as described in the document "Circuit Design of Television Receiver, pp. 125-127, published by RAJIO GIJUTSUSHA in Japan in 1968", for example.

The video intermediate frequency signal filtered by the bandpass filter 33 is amplified by an amplifier 35. The amplifier 35 is controlled by an automatic gain control system so that the output of the amplifier 35 is always maintained at a predetermined appropriate amplitude even if the amplitude of the inputted to television broadcasting signal varies. The output of the amplifier 35 is received by a phase locked loop (hereinafter referred to as PLL) circuit 37 and a synchronous detection circuit 39. The PLL circuit 37 comprises a voltage controlled oscillator (hereinafter referred to as VCO) 41, a phase comparator 43 for phase-comparing outputs of the VCO 41 and the amplifier 35, and a loop filter 45 for filtering the output of the phase comparator 43 to supply the filtered output to the control input of the VCO 41. When the PLL circuit 37 is locked, the output of the VCO 41 has the same frequency and a difference in phase of 90° as compared with the video carrier (frequency $f_p$) of the video intermediate frequency signal. The output of the VCO 41 is phase shifted by 90° by a phase shifter 47 to become the same in phase with the video carrier of the video intermediate frequency signal, and then received by the synchronous detection circuit 39. On the basis of this received signal, the synchronous detection circuit synchronous-detects the video intermediate frequency signal outputted from the amplifier 35, to derive the video detection output signal.

In the conventional video detection circuit hereinbefore described, the bandpass characteristic of the bandpass filter 33 has the inclination in the vicinity of frequency $f_p$, as shown in FIG. 8. As a result, the video carrier signal is subjected to phase modulation by the AM component of the video intermediate frequency signal, as described in the above document and Japanese Patent publication Gazette No. 61-11030, for example. The output of the VCO 41 exactly follows the video carrier signal as phase-modulated. The synchronous detection circuit 39 synchronous-detects the video intermediate frequency signal on the basis of this output of the VCO 41. Thus, a phase modulation component is mixed in the sound intermediate frequency signal component included in the video detection output signal. The phase modulation component& becomes a sound buzz when the sound intermediate frequency signal is frequency-demodulated.

To solve this problem, a circuit shown in FIG. 4 is proposed, wherein an additional circuit 40 for a sound signal is provided in parallel with the video detection circuit 17 shown in FIG. 2. The additional circuit 40 has the same circuit structure as that of the video detection circuit 17 with the exception that a bandpass filter 33a has bandpass characteristics shown in FIG. 5. In this additional circuit 40, a video carrier signal of frequency $f_p$ is extracted without being subjected to phase modulation, through the bandpass characteristic A of the bandpass filter 33a which is symmetrical with respect to the frequency $f_p$, and amplified by an amplifier 35a to be received as a reference signal by a PLL circuit 37a comprising a VCO 41a a phase comparator 43a and a loop filter 45a. The output of the VCO 41a is phase-shifted by 90° through a phase shifter 47a to be received by a synchronous detection circuit 39a. On the other hand, a sound intermediate frequency signal having sound carrier frequency $f_{S1}$ is extracted through the bandpass characteristic B of the bandpass filter 33a, which is symmetrical with respect to the sound carrier frequency $f_{S1}$, to be received by the synchronous detection circuit 39a after amplified through the amplifier 35a. The synchronous detection circuit 39a converts in frequency the received sound intermediate frequency signal on the basis of the output of the phase shifter 47a to output a sound intermediate frequency signal of sound carrier frequency $f_{S2}$ ($=f_p-f_{S1}$). The output of the VCO 41a includes no phase modulation component since the output of the bandpass filter 33a includes no phase modulation component as hereinbefore described. Therefore, the sound intermediate frequency signal outputted from the synchronous detection circuit 39a includes no phase modulation component, and hence no sound buzz is caused when this sound intermediate frequency signal is frequency-demodulated.

However, this system requires two circuits of the structure shown in FIG. 2, to complicate a circuit structure and increase a cost. Further, two VCOs 41 and 41a are required, to weaken resistance to noise and increase the number of external parts necessary in integration.

SUMMARY OF THE INVENTION

A video intermediate frequency signal processing circuit in accordance with the present invention comprises input means for inputting a video intermediate frequency signal having video carrier frequency $f_p$, a first filter connected to the input means and having a first bandpass characteristic which is symmetrical with respect to the frequency $f_p$ in a relatively narrow frequency range, for filtering the video intermediate frequency signal through the first bandpass characteristic to output a first filtering output, a second filter connected to the input means and having a second bandpass characteristic which is required for demodulating the video intermediate frequency signal to generate a normal video signal, for filtering the video intermediate frequency signal through the second bandpass characteristic to output a second filtering output, a phase locked loop circuit connected to the first filter and having a voltage controlled oscillator, for deriving a PLL signal phase-locked to the first filtering output through the voltage controlled oscillator, automatic phase shift means connected to the second filter and the phase locked loop circuit, for shifting in phase the PLL signal so that the second filtering output and the PLL signal as shifted have the same phase, and a synchronous detection circuit connected to the second filter and the automatic phase shift means, for synchronous-detecting the second filtering output on the basis of the PLL signal outputted from the automatic phase shift means, to output a video detection output signal.

According to the present invention, the automatic phase shift means automatically shifts in phase the PLL signal outputted from the voltage controlled oscillator of the phase locked loop so that both signals inputted in the synchronous detection circuit become the same in phase. Thus, the synchronous detection circuit generates a video detection output signal which includes a video signal accurately demodulated and a sound intermediate frequency signal having no phase modulation component.

Accordingly, it is an object of the present invention to provide a video intermediate frequency signal processing circuit which can generate a video signal accurately demodulated and a sound intermediate frequency signal having no phase modulation component by using a signal phase locked loop circuit.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
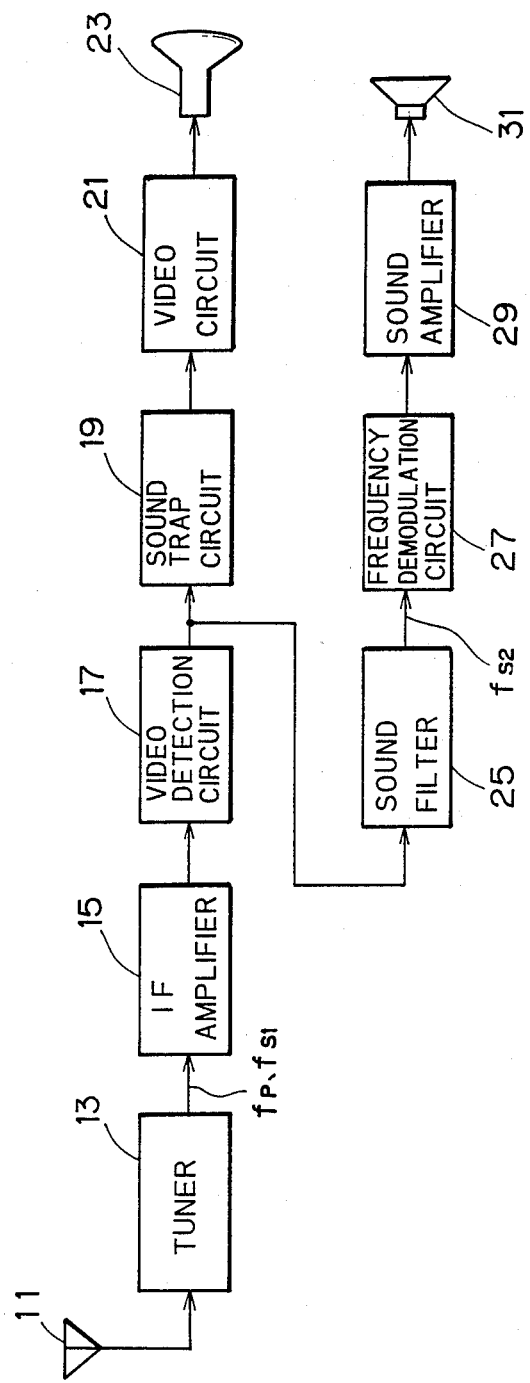
FIG. 1 is a block diagram showing the circuit structure of a conventional television receiver of an intercarrier system.
Figure 2:
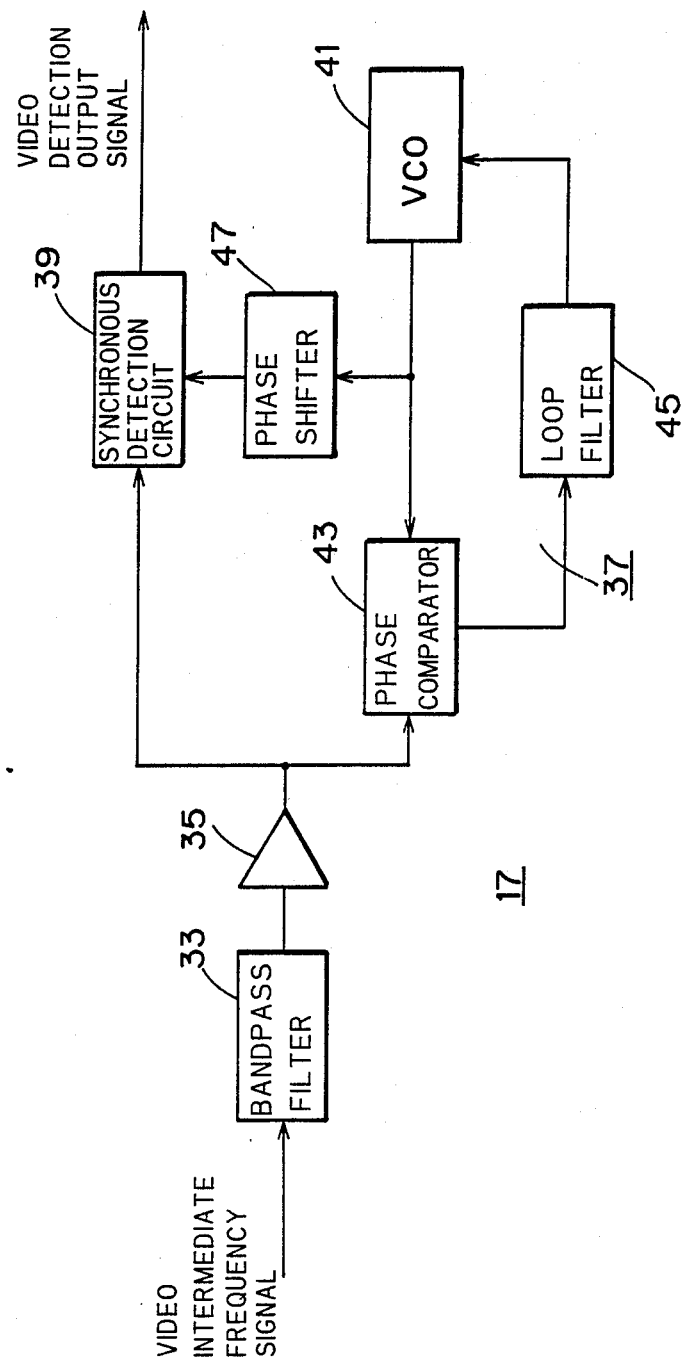
FIG. 2 is a block diagram showing a conventional video detection circuit
Figure 3:
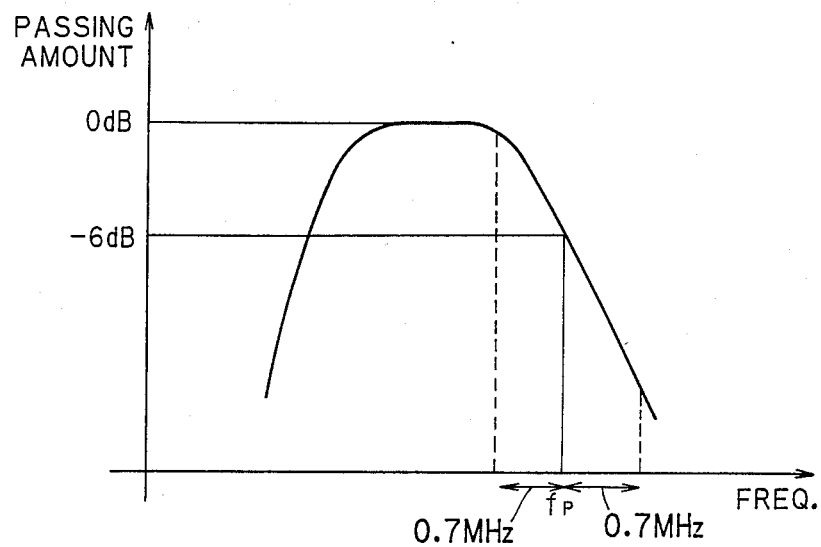
FIG. 3 is a graph showing the bandpass characteristic of a bandpass filter used in the circuit shown in FIG. 2.
Figure 6:
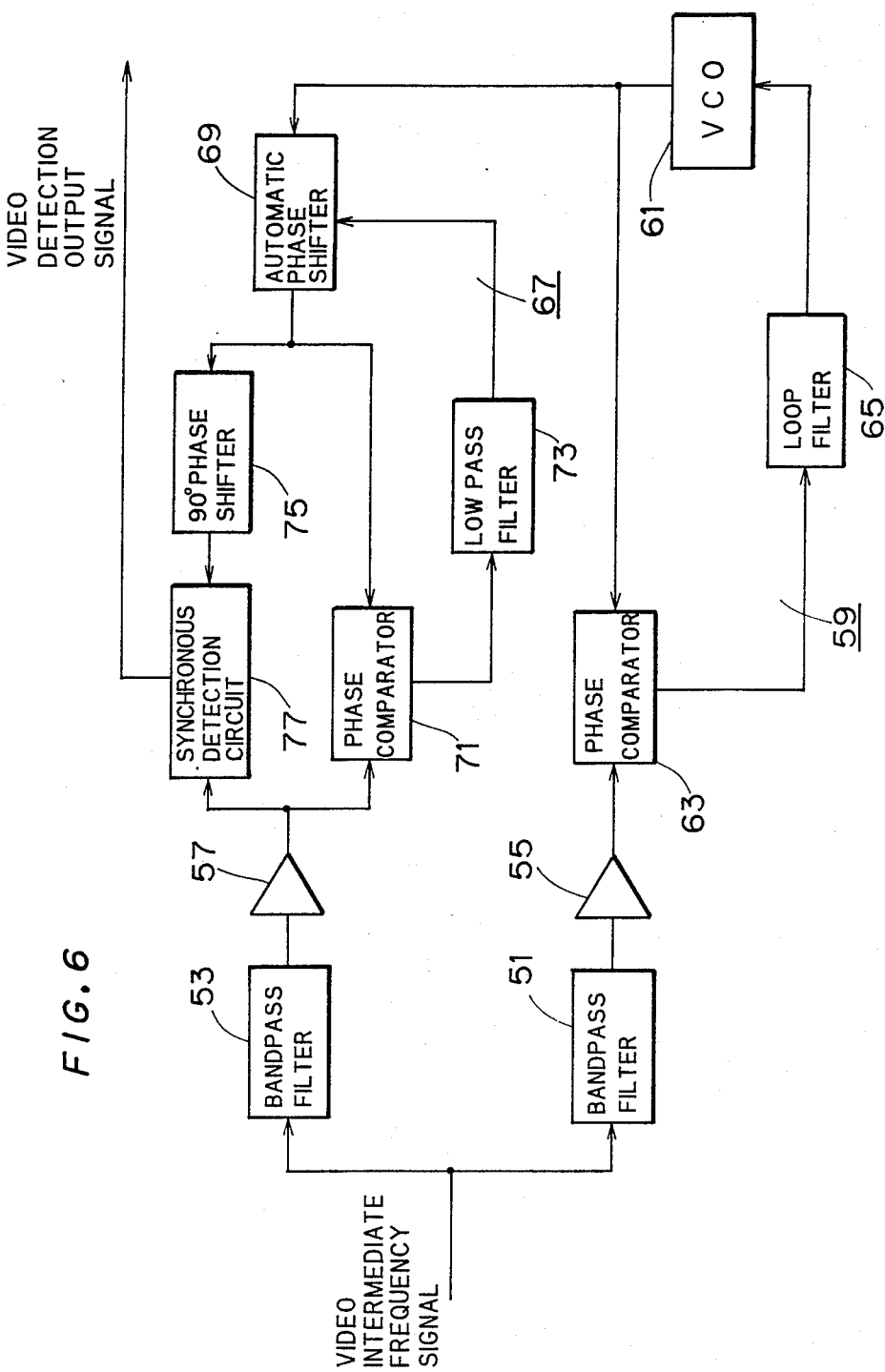
FIG. 6 is a block diagram showing an embodiment of a video intermediate frequency signal processing circuit in accordance with the present invention.
Figure 7:
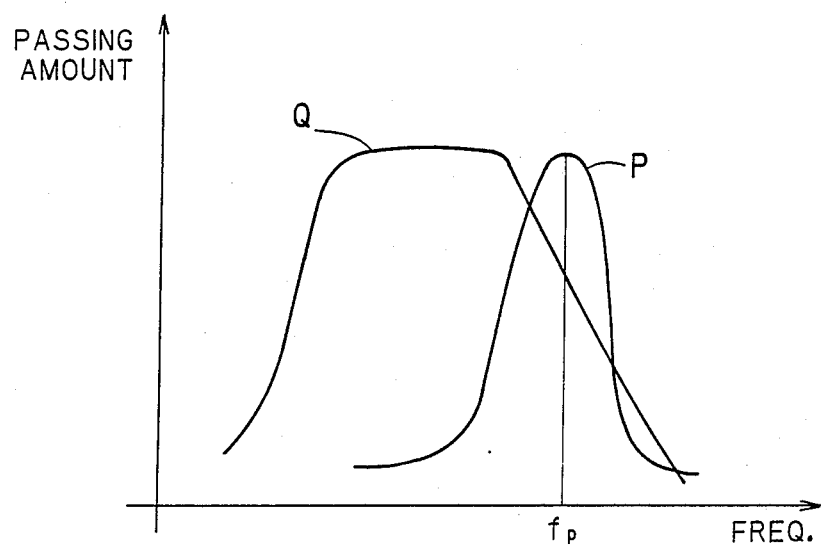
FIG. 7 is a graph showing bandpass characteristics of bandpass filters used in the circuit shown in FIG. 6.

FIG. 6 is a block diagram showing an embodiment of a video intermediate frequency signal processing circuit in accordance with the present invention. A video intermediate frequency signal which is outputted from the intermediate frequency amplifier 15 shown in FIG. 1, is received by first and second bandpass filters 51 and 53. The first bandpass filter 51 has a bandpass characteristic P shown in FIG. 7, which is symmetrical with respect to the video carrier frequency $f_p$ of the video intermediate frequency signal in a relatively narrow frequency range. The second bandpass filter 53 has a well known bandpass characteristic Q shown in FIG. 7, which ia required to demodulate a video intermediate frequency signal to generate a normal video signal. This bandpass characteristic Q is basically the same as that shown in FIG. 3. These bandpass filters 51 and 53 may be formed by a surface acoustic wave filter. Further, these may be formed as two discrete elements or as a single element on a single substrate. In the case of two discrete elements, it is advantageous that a degree of freedom becomes wide in the selection of two kinds of surface acoustic wave filter. In the case of a single element formed on a single substrate, it is advantageous &hat phase delay amounts of both bandpass filters 51 and 53 become equal to each other.

The first bandpass filter 51 outputs the video carrier component of the video intermediate frequency signal. This output of the first bandpass filter 51 is amplified by a first amplifier 55 to be received by a post-stage. The second bandpass filter 53 outputs a video intermediate frequency signal having a predetermined frequency characteristic. This output of the second bandpass filter 53 is amplified by a second amplifier 57 to be received by a post-stage. These first and second amplifiers 55 and 57 may have the same circuit structure or different circuit structures, and be controlled in the same gain or different gains if a gain control is performed. If the circuit structures and the gain values in the gain control of the first and second amplifiers 55 and 57 are the same, phase delay amounts of the amplifiers 55 and 57 become equal to each other. If different, a degree of freedom becomes wide in the selection of circuit.

The video carrier component of the video intermediate frequency signal amplified by the first amplifier 55 is received by a PLL circuit 59, which comprises a VCO 61, a phase comparator 63 for phase-comparing the output of the VCO 61 with the output of the first amplifier 55 and a loop filter 65 for filtering the output of the phase comparator 63 to supply the same to the control input of the VCO 61. The bandpass filter 51 has the bandpass characteristic P shown in FIG. 7, which is symmetrical with respect to the video carrier frequency $f_p$ of the video intermediate frequency signal, as hereinbefore described, and hence the video carrier component of the video intermediate frequency signal extracted by this bandpass filter 51 is not subjected to phase modulation due to the AM component of the video intermediate frequency signal. Therefore, the output of the VCO 61 has the same frequency and a phase difference of precisely 90° as compared with the video carrier of the video intermediate frequency signal, when the PLL circuit 59 is locked.

The output of the VCO 61 is received by an automatic phase control loop 67 which comprises an automatic phase shifter 69 for shifting in phase the output of the VCO 61, a phase comparator 71 for comparing the phase of an output of the automatic phase shifter 69 with the phase of the output of the second amplifier 57 and a low pass filter for removing a high frequency component from the output of the phase shifter 71 to supply the same to the control input of the automatic phase shifter 69. By virtue of the operation of the automatic phase control loop 67, the output of the automatic phase shifter 69 is always kept in a phase difference of precisely 90° with respect to the output of the second amplifier 57.

Figure 8:
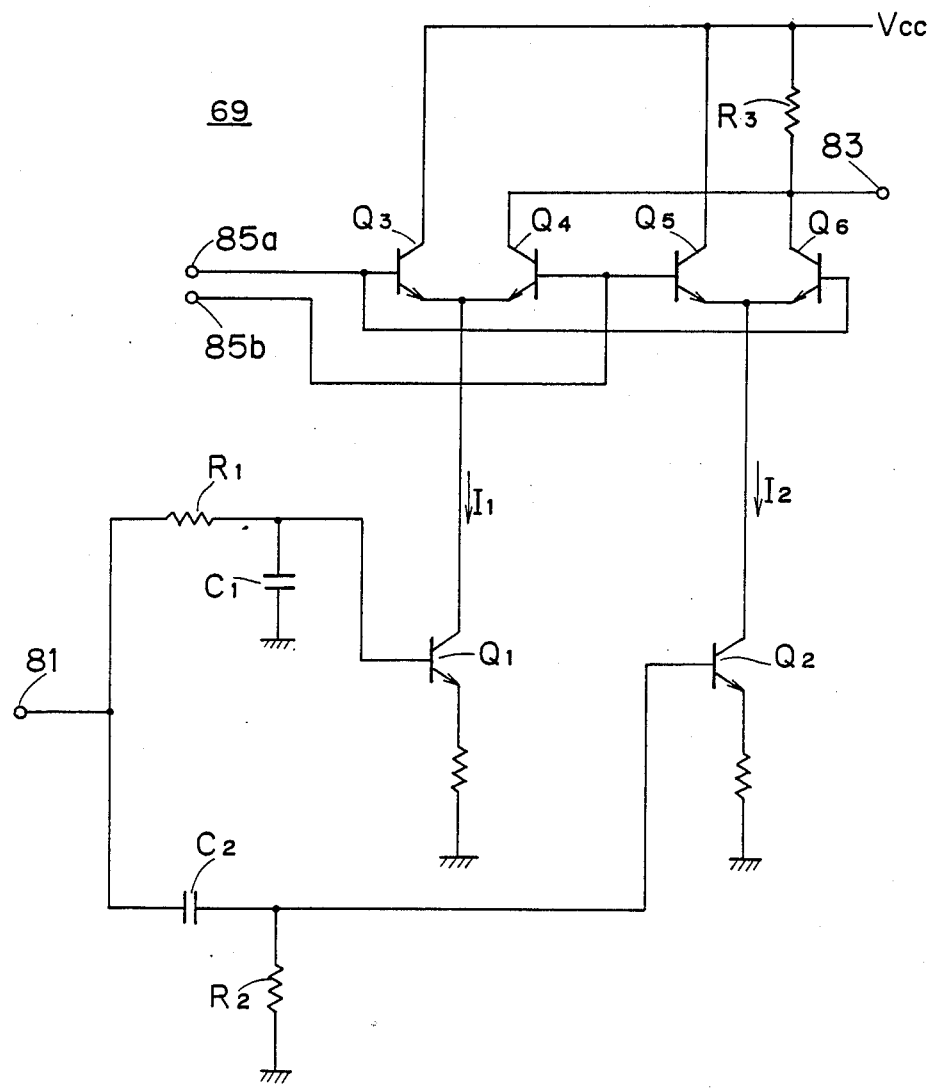
FIG. 8 is a circuit diagram showing an example of the circuit structure of an automatic phase shifter used in the circuit shown in FIG. 6.

FIG. 8 is a circuit diagram showing an example of the circuit structure of the automatic phase shifter 69. This automatic phase shifter 69 has an input terminal 81 for receiving the output of the VCO 61, an output terminal for outputting a signal which is shifted in phase by a predetermined amount with respect to the output of the VCO 61 and a pair of control input terminals 85a and 85b for receiving the output of the low pass filter 73. The output of the VCO 61 received by the input terminal 81 is delayed in phase by 45° through a series resistor $R_1$ and a parallel capacitor $C_1$ to be received by the base of a transistor $Q_1$ and advanced in phase by 45° through a series capacitor $C_2$ and a parallel resistor $R_2$ to be received by the base of a transistor $Q_2$. The transistors $Q_1$ and $Q_2$ responsively operate, so that collector currents $I_1$ and $I_2$ flow in accordance with the signals received by the bases. Thus, the current $I_1$ has a phase delayed by 45° with respect to the output of the VCO 61 and the current $I_2$ has a phase advanced by 45°.

These currents $I_1$ and $I_2$ are compounded through a differential amplifier comprising transistors $Q_3$ and $Q_4$ and a differential amplifier comprising transistors $Q_5$ and $Q_6$ in accordance with the signals received by the control input terminals 85a and 85b, to flow through a resistor $R_3$. A signal in accordance with a voltage drop in the resistor $R_3$ is outputted from the output terminal 83. When the d.c. voltage of the control input terminal 85a is sufficiently larger than that of the control input terminal 85b, the transistors $Q_3$ and $Q_6$ are in conducting state and the transistors $Q_4$ and $Q_5$ are in nonconducting state, and hence the collector current $I_2$ of the transistor $Q_2$ flows through the resistor $R_3$. Therefore, the output signal from the output terminal 83 is advanced in phase by 45° with respect to the output of the VCO 61. On the other hand, when the d.c. voltage of the control input terminal 85b is sufficiently larger than that of the control input terminal 85b, the transistors $Q_4$ and $Q_6$ are in conducting state and the transistors $Q_3$ and $Q_6$ are in nonconducting state, and hence the collector current $I_1$ of the transistor $Q_1$ flows through the resistor $R_3$. Therefore, the output signal from the output terminal 83 is delayed in phase by 45° with respect to the output of the VCO 61. Thus, the output signal from the output terminal 83 is shifted in phase within a range of +45° to −45° with respect to the output of the VCO 61.

By designing the circuit such that the output of the phase comparator 71 becomes zero, i.e., a voltage difference between the control input terminals 85a and 88b becomes zero, when outputs of the automatic phase shifter 69 and the second amplifier 57 have a phase difference of 90°, the output of the automatic phase shifter 69 is always kept in phase difference of exactly 90° with respect to the output of the second amplifier 57. In other words, even if the video carrier signal of the video intermediate frequency signal is phase-modulated by the AM component of the video intermediate frequency signal due to the liner inclination of the bandpass characteristic Q of the second bandpass filter 53 in the vicinity of the frequency $f_p$, as hereinbefore described, or even if phase delay amounts of signals differ from each other due to usage of different structures of the first and second bandpass filters 51 and 53 or the first and second amplifiers 55 and 57, the output of the automatic phase shifter 69 exactly follows such a phase variation.

The output of the automatic phase shifter 69 is shifted in phase by 90° through a 90° phase shifter 75 to become the same in phase as the video carrier signal of the video intermediate frequency signal outputted from the second amplifier 57, to be received by a synchronous detection circuit 77. On the basis of this signal, the synchronous detection circuit 77 synchronous-detects the video intermediate frequency signal outputted from the second amplifier 57, to derive a video detection output the video intermediate frequency signal. A sound intermediate frequency signal included in the video detection output signal includes no phase modulation component, and hence no sound buzz is caused when the sound intermediate frequency signal is frequency-demodulated.

Figure 5:
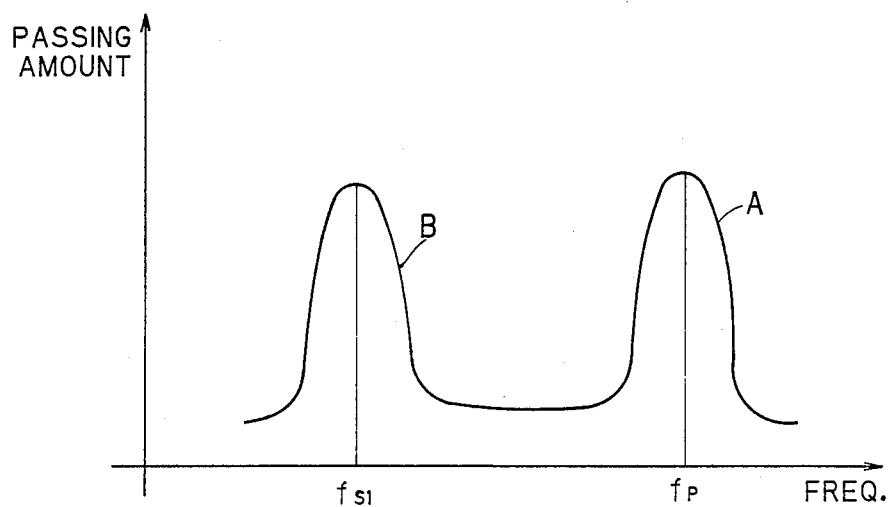
FIG. 5 is a graph showing the bandpass characteristic of a bandpass filter used in the circuit shown in FIG. 4.
Figure 4:
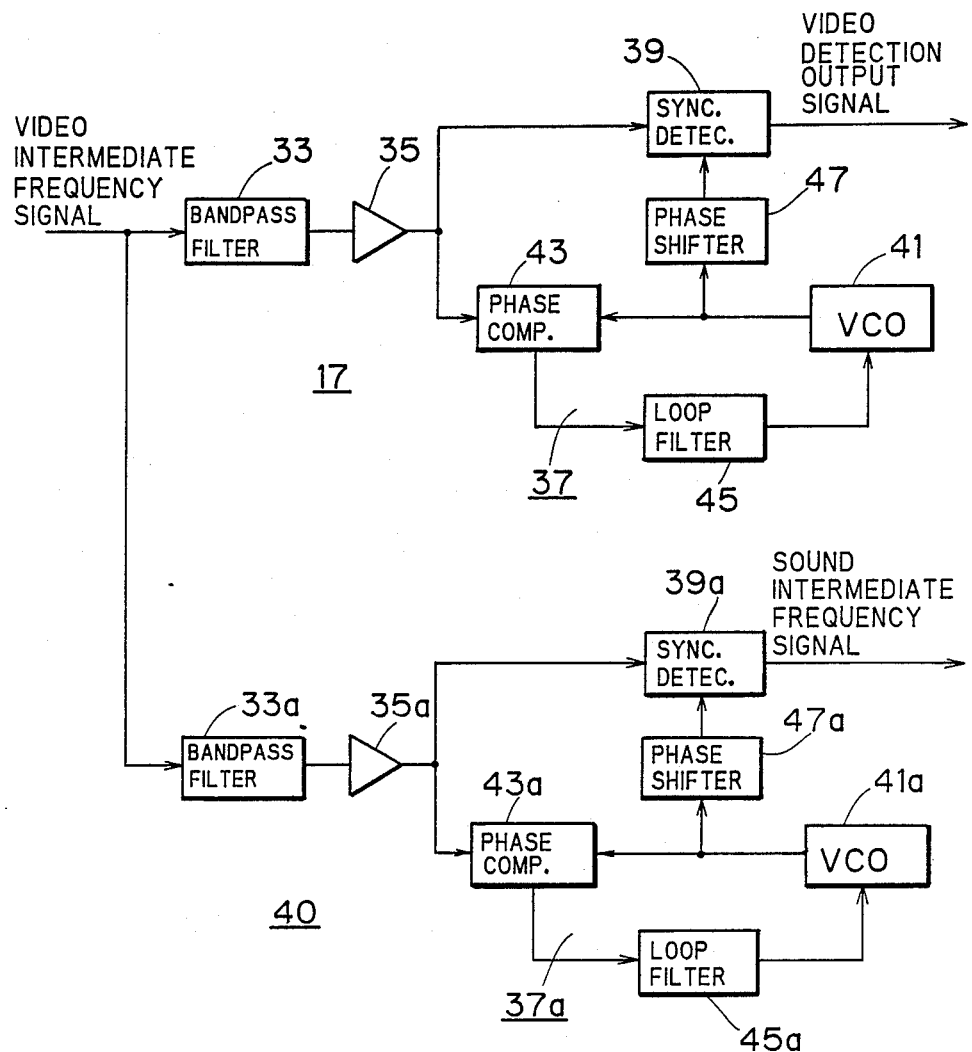
FIG. 4 is a block diagram showing another conventional video detection circuit.
Figure 10:
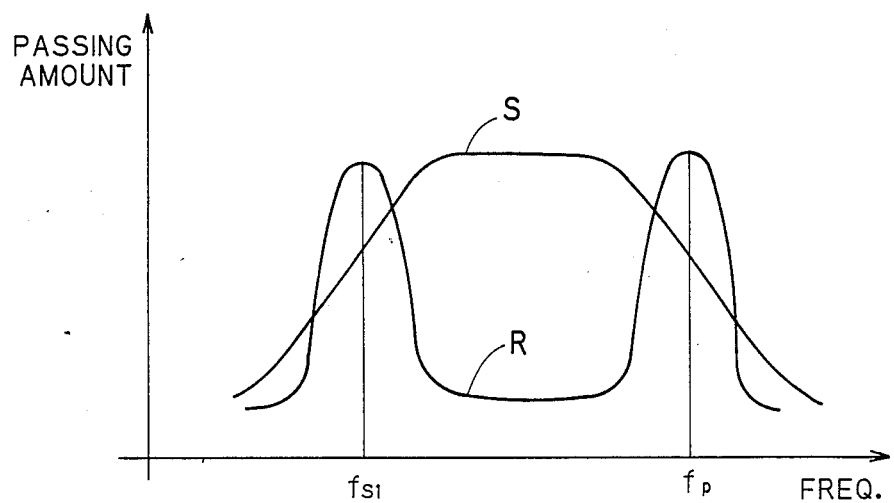
FIG. 10 is a graph showing bandpass characteristics of bandpass filters used in the circuit shown in FIG. 9.
Figure 9:
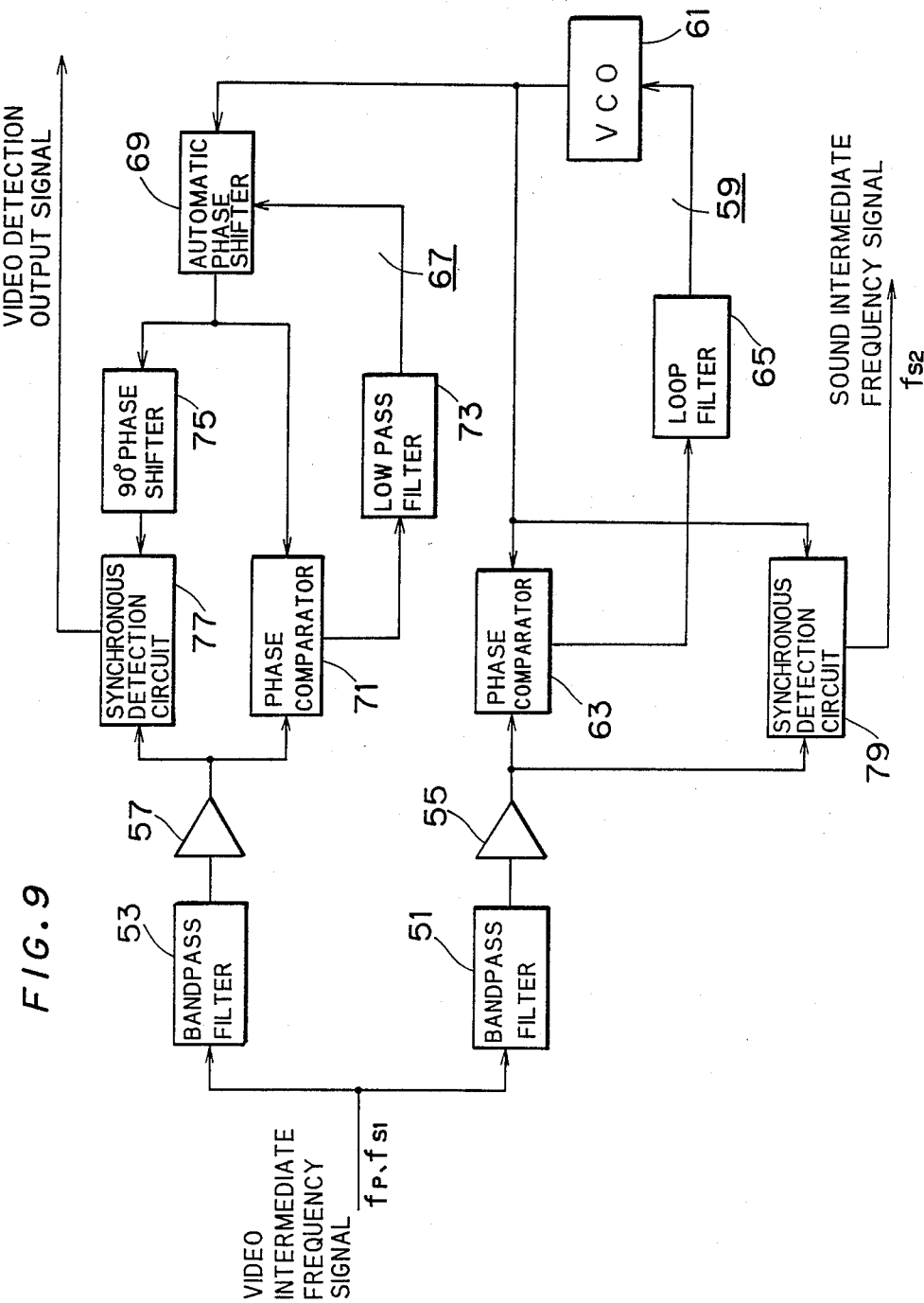
FIG. 9 is a block diagram showing another embodiment of the video intermediate frequency signal processing circuit in accordance with the present invention.

FIG. 9 is a block diagram showing another embodiment of the video intermediate frequency signal processing circuit in accordance with the present invention. This video intermediate frequency signal processing circuit has a second synchronous detection circuit 79 connected in parallel with a phase comparator 63, in addition to &he structure of the video intermediate frequency signal processing circuit shown in FIG. 6. First and second bandpass filters 51 and 53 have bandpass characteristics R and S shown in FIG. 10, respectively. These bandpass characteristics are basically the same as those shown in FIG. 3 and FIG. 5.

Through the circuit shown in FIG. 9, a video signal is accurately demodulated from a video intermediate frequency signal in operation similar to the circuit shown in FIG. 6. On the other hand, the synchronous detection circuit 79 receives the output of a VCO 61 and the output of a first amplifier 55 to perform synchronous detection processing. The VCO 61 oscillates in frequency $f_p$ when a PLL circuit 59 is locked and, therefore, a sound intermediate frequency signal of frequency $f_{S1}$ included in the output of the first amplifier 55 is converted in frequency by the synchronous detection circuit 79 to be outputted as a second sound intermediate frequency signal having a frequency of $f_{S2}$ ($=f_p-f_{S1}$). This second sound intermediate frequency signal includes no phase modulation includes no phase modulation component as hereinbefore described with respect to the bandpass filter 51 of FIG. 6. Hence no sound buzz is caused when this second sound intermediate frequency signal is frequency-demodulated.

In the above embodiments, the 90° phase shifter 75 may be eliminated, by so constructing the automatic phase control loop 67 that the output of the automatic phase shifter 69 is the same in phase as the output of the second bandpass filter 53.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video intermediate frequency signal processing circuit comprising:
   input means for inputting a video intermediate frequency signal having video carrier frequency $f_p$;
   a first filter connected to said input means and having a first bandpass characteristic which is symmetrical with respect to said frequency $f_p$ in a relatively narrow frequency range, for filtering said video intermediate frequency signal through said first bandpass characteristic to output a first filtering output;
   a second filter connected to said input means and having a second bandpass characteristic which is required for demodulating said video intermediate frequency signal to generate a normal video signal, for filtering said video intermediate frequency signal through said second bandpaas characteristic to output a second filtering output;
   a phase locked loop circuit connected to said first filter and having a voltage controlled oscillator, for deriving a PLL signal phase-locked to said first filtering output through said voltage controlled oscillator;
   automatic phase shift means connected to said second filter and said phase locked loop circuit, for shifting in phase said PLL signal so that said second filtering output and said PLL signal as shifted have the same phase; and
   a synchronous detection circuit 7 connected to said second filter and said automatic phase shift means for synchronous-detecting said second filtering output on the basis of said PLL signal outputted from said automatic phase shift means, to output a video detection output signal.

2. A video intermediate frequency signal processing circuit in accordance with claim 1, wherein
   said automatic phase shift means includes an automatic phase control loop,
   said automatic phase control loop comprising;
   an automatic phase shifter connected to said phase locked loop circuit, for receiving a control signal to shift in phase said PLL signal by a phase amount responsive to said control signal,
   a phase comparator coupled to said second filter an said automatic phase shifter, for comparing in phase said second filtering output with said PLL signal outputted from said automatic phase shifter, to output a comparison output, and
   a third filter connected to said phase comparator and said automatic phase shifter, for filtering said comparison output to output said control signal to said automatic phase shifter.

3. A video intermediate frequency signal processing circuit in accordance with claim 2, wherein said automatic phase shift means further comprises a phase shifter connected to said automatic phase shifter, for shifting in phase by a predetermined phase said PLL signal outputted from said automatic phase shifter.

4. A video intermediate frequency signal processing circuit in accordance with claim 3, wherein said phase shifter includes a 90° phase shifter for shifting in phase by 90° said PLL signal outputted from said automatic phase shifter.

5. A video intermediate frequency signal processing circuit in accordance with claim 3, wherein
   said automatic phase shifter comprises;
   a first input terminal for receiving said PLL signal,
   a second input terminal for receiving said control signal,
   an output terminal,
   a phase delaying circuit connected to said first input terminal, for delaying in phase said PLL signal by a first predetermined phase to output a delayed signal,
   a phase advancing circuit connected to said first input terminal, for advancing in phase said PLL signal by a second predetermined phase to output a advanced signal,
   a compounding circuit connected to said second input terminal, said phase delaying circuit, said phase advancing circuit and said output terminal, for compounding said delayed signal and said advanced signal in a ratio responsive to said control signal to output said PLL signal control signal from said output terminal.

6. A video intermediate frequency signal processing circuit in accordance with claim 5, wherein
   said phase delaying circuit includes a series resistor and a parallel capacitor which are coupled to said first input terminal, and
   said phase advancing circuit includes a series capacitor and a parallel resistor which are coupled to said first input terminal.

7. A video intermediate frequency signal processing circuit in accordance with claim 5, wherein
   said second input terminal includes a pair of first and second control input terminals,
   said compounding circuit comprising;
   first and second power source,
   a first transistor having a control electrode connected to said phase delaying circuit for receiving said delayed signal, a first electrode coupled to said first power source and a second electrode,
   a second transistor having a control electrode connected to said phase advancing circuit for receiving said advanced signal, a first electrode coupled to said first power source and a second electrode,
   a first differential amplifier comprising third and fourth transistors having first electrodes connected to each other and to said second electrode of said first transistor, said third transistor having a control electrode connected to said first control input terminal and a second electrode coupled to said second power source, said fourth transistor having a control electrode connected to said second control input terminal and a second electrode connected to said output terminal,
   a second differential amplifier comprising fifth and sixth transistors having first electrodes connected to each other and to said second electrode of said second transistor, said fifth transistor having a control electrode connected to said second control input terminal and a second electrode coupled to said second power source, said sixth transistor having a control electrode connected to said first control input terminal and a second electrode connected to said output terminal, and a resistor coupled between said output terminal and said second power source.

8. A video intermediate frequency signal processing circuit in accordance with claim 1, further comprising another synchronous detection circuit coupled to said first filter and said phase locked loop circuit, for synchronous-detecting said first filtering output on the basis of said PLL signal to output a sound intermediate frequency signal.

* * * * *